United States Patent
Giry et al.

(10) Patent No.: US 8,040,603 B2
(45) Date of Patent: Oct. 18, 2011

(54) TRANSPARENCY AND BACKLIGHT FOR CINEMA SCREEN

(76) Inventors: François Giry, Challes les Eaux (FR); Gérard Debard, Chamboeuf (FR); Pierre Piccaluga, Macon (FR)

(*) Notice: Subject to any disclaimer, the term of this patent is extended or adjusted under 35 U.S.C. 154(b) by 0 days.

(21) Appl. No.: 12/679,833

(22) PCT Filed: Sep. 24, 2007

(86) PCT No.: PCT/FR2007/001550
§ 371 (c)(1),
(2), (4) Date: Jul. 2, 2010

(87) PCT Pub. No.: WO2009/040480
PCT Pub. Date: Apr. 2, 2009

(65) Prior Publication Data
US 2010/0290113 A1    Nov. 18, 2010

(51) Int. Cl.
*G03B 21/60* (2006.01)
(52) U.S. Cl. ....................................... 359/445
(58) Field of Classification Search .................. 348/725; 349/96; 353/7, 10, 2, 319; 355/77; 359/9, 359/31, 296, 381, 443–445, 452, 457, 589; 372/43, 45, 99; 362/612
See application file for complete search history.

(56) References Cited

U.S. PATENT DOCUMENTS

| | | | | |
|---|---|---|---|---|
| 5,197,103 A * | 3/1993 | Hayakawa | | 381/349 |
| 7,031,058 B2 * | 4/2006 | Oya et al. | | 359/443 |
| 2004/0240687 A1 * | 12/2004 | Graetz | | 381/152 |
| 2008/0074901 A1 * | 3/2008 | David et al. | | 362/612 |
| 2008/0085019 A1 * | 4/2008 | Wagenaars et al. | | 381/152 |
| 2011/0013090 A1 * | 1/2011 | Matsumoto | | 348/725 |

FOREIGN PATENT DOCUMENTS
WO    01/31398    5/2001
WO    2007/080235    7/2007

* cited by examiner

*Primary Examiner* — Clayton E Laballe
*Assistant Examiner* — Kevin Butler
(74) *Attorney, Agent, or Firm* — Allen, Dyer, Doppelt, Milbrath & Gilchrist, P.A.

(57) ABSTRACT

A cinema screen may include a housing including at least one of wood and polymer and configured to hold the cinema screen by at least one of gluing and pinching. The screen may include a metalloplastic multi-layer film coupled to the housing and have a relatively small thickness. The multi-layer film may also have a bottom layer that may be translucent and other layers of multi-layer film may be transparent. The screen may also include a plurality of lamps to provide light. The multi-layer film may be configured to diffuse the light, which may be softly filtered thereby to reduce contrasts, and increase a quantity of light information in front of and behind the cinema screen. The light information may vary with a greater softness. The multi-layer film may also be configured to provide relief image playback accuracy.

14 Claims, 1 Drawing Sheet

Fig. 1
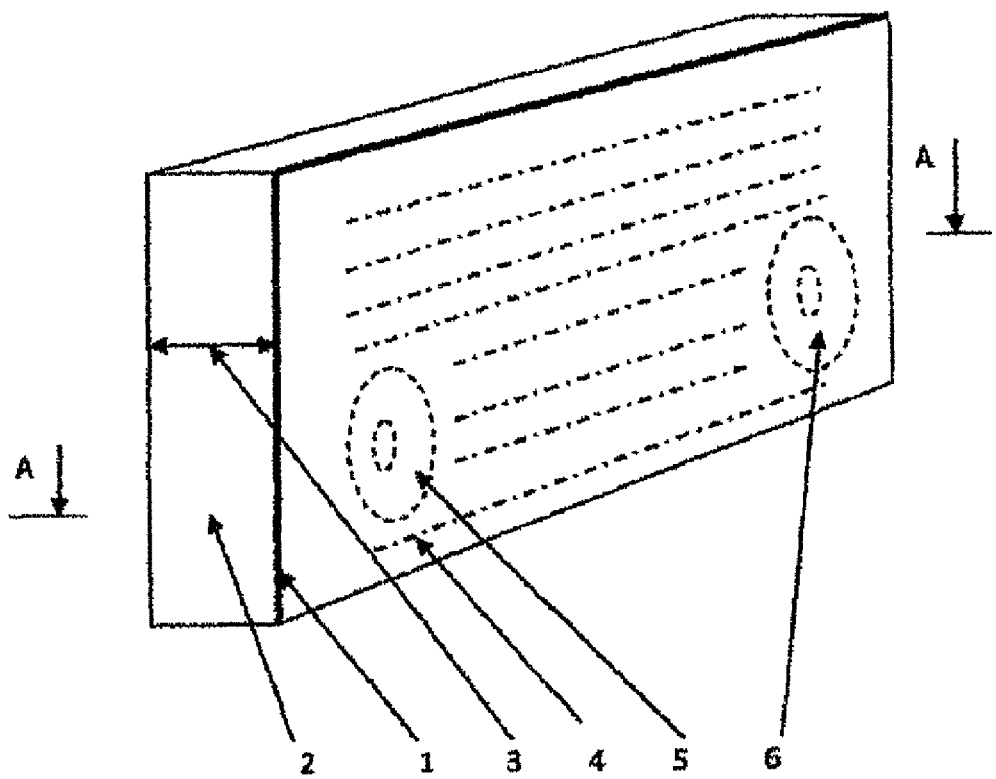
1 2 3 4 5 6
Cross-section A-A
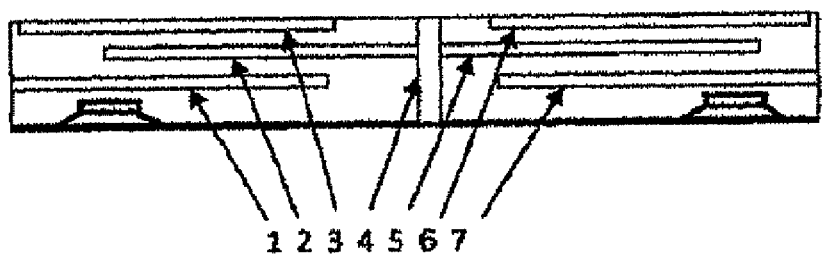
1 2 3 4 5 6 7
Fig. 2

TRANSPARENCY AND BACKLIGHT FOR CINEMA SCREEN

FIELD OF THE INVENTION

The present invention relates to the field of video displays, and more particularly to the field of cinema screens.

BACKGROUND OF THE INVENTION

Cinema screens are typically made of perforated cloth for letting sound through, and typically have a thick texture that reflects the direct light of the projector. Typically, only the screens of the back-projectors are transparent to let the light rays coming from behind the screen pass through. This back-projector technology generally does not allow for large screen surfaces to be obtained.

Two observed natural phenomena oblige us to take into account the facts that, first, all objects absorb a portion of the light and reject the visible non-absorbed colors and, second, ambient light comes from all sides, including from behind the object with all the incidence degrees of light diffractions reflected therein. These two facts form the motivation for the present patent application filing.

In practice, the use of a multitude of light sources as a background for the screen makes it possible to re-establish a natural light balance that may not exist on current cinema screens. PCT application No. FR2006/000073 describes the use of a multi-layer screen of which the bottom layer of the multi-layer screen is a highly reflective surface including, for example, of a sheet of micronized aluminum or vacuum-sputtered aluminum or silver. The bottom layer is translucent, and the other layers are translucent or transparent.

The assembly greatly increases the light diffractions of the projector. The effect is reinforced, if necessary, by transparent micro-droplets or micro-balls placed between the layers of the multi-layer screen.

The screen is produced with metalloplastic films, which are relatively thin and allow through and filter a low soft diffuse light intensity through the silvered or aluminized bottom film. This principle of light sources added behind the screen adds a "contre-jour" or backlighting effect that may be important for the light quality of the images. More particularly, it may be important to obtain an image having a real natural balance of the colors and of the perspective forms of the objects.

In practice, the stable backlights bring visual comfort and a chromatic stability that greatly amplify the diffractions. The chromatics and density of the lights are regulated by this principle, which is made possible by the translucent bottom layer, and the backlights, which may give a projection that conforms to the optical sensitivity of the eye and of the nervous system. The projection is non-aggressive.

Contrast variations may not be useful, whereas the quantity of information on sensitive variations of all the lights is typically vital. The significant quantity of soft variation of the light is more effective than the variation of intensity of the aggressive contrasts of hard direct light from the projector, which stains the image and tires the sight.

BRIEF DESCRIPTION OF THE DRAWINGS

FIG. 1 is a schematic diagram of a screen in accordance with the present invention.

FIG. 2 is a cross-sectional view of the screen in FIG. 1 taken along the line A-A.

DETAILED DESCRIPTION OF THE PREFERRED EMBODIMENTS

This screen principle offers improved visual comfort and an improved relief image playback accuracy, made possible by the metalloplastic film which manages the balance on the front and back faces of the direct and indirect light. A metalloplastic film has a thickness that is calculated up to 100 or even 200 microns, which make it possible to let through/make out a backlight source. The backlight source is combined with the projection to provide a regularization of the light amplitudes favorable to the comfortable viewing of the film or movie.

This screen also allows for the diffusion of sound waves, since its thin structure lets sound through that is unaltered in frequency or intensity. No incidence of acoustic distortion has been noted, and an improvement on the low and high notes that have become clean, soft, and highly present has been noted. The production conditions are set up by those skilled in the art, and this example is not limiting on the implementation of FIG. 1.

The screen 1 illustratively measures 1.5 meters high and 2.5 meters wide and includes a non-perforated uniform multi-layer film. The multi-layer film forming the screen is placed on a frame 2 to be tautened thereon. The screen is fitted while taut, either glued or held by pinching.

In the space of the interior of the frame, which is determined by the thickness 3 of the frame and which is 40 centimeters deep, for example, it may be useful to place one or more series of LEDs 4, or one or more lamps along with respective diffusion reflectors. The light emission color of the LEDs, which may number about fifty to about one or several hundred, for example, may have an adjustable intensity, and may be situated in the chromatic range of ultraviolet. In terms of color, the emission color of the LEDs may be similar to colors from black-light neon tubes to the white spectrum. Neon tubes may therefore fulfill the functions.

Within the thickness of the frame that constitutes its depth, acoustic loudspeakers 5, 6 may be implanted to diffuse the soundtrack of the films or movies being shown. The screen is acoustically transparent because of its elasticity at the audio frequency ranges. A slight linear attenuation of a low correction gradient on the low notes may be compensated with few, if any, problems.

The back of the frame is closed to reduce any diffusion of the light into the room where the film or movie is being viewed. It may be possible to imagine an acoustic housing behind the screen that is relatively large and that includes chicanes that may prevent the light from passing through, but let the sound waves that circumvent the chicanes pass through.

FIG. 2 is a cross-section along the lines A-A of the device with 7 (labeled as reference numerals 1 to 7) sound chicanes that also may prevent light from being let through. The chicanes, which may be made of wood or of an injection-molded plastic or polymer, for example, are produced in black or coated with a black color that does not dissipate the light. The number of chicanes is implemented by those skilled in the art.

This type of screen simplifies the space occupied by a home cinema assembly, either in the home or in a professional auditorium, by having a compact assembly of high audio-visual quality. The audio-visual representations in a few conditions, for example, on a stand or at an event in a truck, for example, are simplified by this implementation that provides improved quality results in the two distinct domains of the image and in the sound diffusion domain. This is an advantage for the audio-visual field.

This configuration that links sound and image may be the ideal conditions for the sensorial perceptions of the cognitive functions of the brain through the common ultra-sensitive diffusion point, i.e. the metalloplastic film. Amplifier technology can also be inserted into the housing on one of the sides.

That which is claimed is:

1. A method of displaying a cinema image comprising:
providing a metalloplastic multi-layer screen having a low thickness for translucence and to allow a low intensity light to pass therethrough and to be filtered thereby, the metalloplastic layer comprising a highly reflective layer that is not perforated;
using the metalloplastic multi-layer screen to reduce contrasts of a projector and increase light information;
operating lights inside a housing and behind the metalloplastic multi-layer screen;
positioning a plurality of loudspeakers within the housing and behind the metalloplastic multi-layer screen; and
positioning a plurality of acoustic chicanes within the housing.

2. The method according to claim 1, further comprising operating the plurality of loudspeakers; and wherein the metalloplastic multi-layer screen is transparent to a sound spectrum.

3. An apparatus comprising:
a housing comprising at least one of wood and polymer;
a metalloplastic multi-layer screen coupled to said housing by at least one of gluing and pinching and having a relatively small thickness, said metalloplastic multi-layer screen also having a layer comprising at least one of aluminum and silver and being translucent, and other layers of metalloplastic multi-layer screen being transparent;
a plurality of lamps comprising at least one of a plurality of light emitting diodes (LEDs) and a plurality of neon lamps, said plurality of lamps being configured to provide light;
a plurality of loudspeakers carried by said housing and positioned behind said metalloplastic multi-layer screen; and
a plurality of acoustic chicanes within said housing;
said metalloplastic multi-layer screen being configured to diffuse the light, which is softly filtered thereby to reduce contrasts and visual aggressivities and increase a quantity of light information from a front and back of said metalloplastic multi-layer screen, the light information varying with a greater softness;
said metalloplastic multi-layer screen also being configured to provide relief image playback accuracy.

4. The apparatus according to claim 3, wherein said metalloplastic multi-layer screen comprises at least one of transparent droplets and transparent micro-balls between layers thereof to increase diffractions of the light.

5. The apparatus according to claim 3, wherein said plurality of lamps comprise a plurality of lamps having an emission color in the ultraviolet chromatic range.

6. The apparatus according to claim 5, wherein the said plurality of lamps comprise a plurality of lamps having an emission color in a range from black-light neon tubes to the white spectrum.

7. An apparatus comprising:
a housing;
a metalloplastic multi-layer screen coupled to said housing and comprising a first layer being translucent and other layers being transparent;
at least one lamp carried by said housing and configured to provide light;
a plurality of loudspeakers carried by said housing and positioned behind said metalloplastic multi-layer screen; and
a plurality of acoustic chicanes within said housing;
said metalloplastic multi-layer screen being configured to diffuse the light.

8. The apparatus according to claim 7, wherein said housing comprises at least one of a wood housing and polymer housing.

9. The apparatus according to claim 7, wherein said housing is configured to hold the metalloplastic multi-layer screen by at least one of gluing and pinching.

10. The apparatus according to claim 7, wherein said first layer comprises at least one of aluminum and silver.

11. The apparatus according to claim 7, wherein said at least one lamp comprises at least one of a plurality of light emitting diodes (LEDs) and a plurality of neon lamps.

12. The apparatus according to claim 7, wherein said metalloplastic multi-layer screen comprises at least one of transparent droplets and transparent micro-balls between the layers thereof.

13. The apparatus according to claim 7, wherein said at least one lamp comprises a plurality of lamps having an emission color in the ultraviolet chromatic range.

14. The apparatus according to claim 13, wherein the said at least one lamp comprises a plurality of lamps having an emission color in a range from black-light neon tubes to the white spectrum.

* * * * *